United States Patent
Wu (10) Patent No.: US 10,748,390 B2
(45) Date of Patent: *Aug. 18, 2020

(54) DYNAMIC HAPTIC GENERATION BASED ON DETECTED VIDEO EVENTS

(71) Applicant: IMMERSION CORPORATION, San Jose, CA (US)

(72) Inventor: Liwen Wu, Verdun (CA)

(73) Assignee: Immersion Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/159,520

(22) Filed: Oct. 12, 2018

(65) Prior Publication Data

US 2019/0080569 A1 Mar. 14, 2019

Related U.S. Application Data

(63) Continuation of application No. 15/338,763, filed on Oct. 31, 2016, now Pat. No. 10,102,723.

(51) Int. Cl.
| | |
|---|---|
| *H04N 5/93* | (2006.01) |
| *G08B 6/00* | (2006.01) |
| *G06F 3/01* | (2006.01) |
| *G06K 9/00* | (2006.01) |

(52) U.S. Cl.
CPC ............ *G08B 6/00* (2013.01); *G06F 3/016* (2013.01); *G06K 9/00711* (2013.01); *H04N 5/9305* (2013.01); *G06K 2009/00738* (2013.01)

(58) Field of Classification Search
None
See application file for complete search history.

(56) References Cited

U.S. PATENT DOCUMENTS

| | | | |
|---|---|---|---|
| 8,754,757 B1 | 6/2014 | Ullrich et al. | |
| 10,102,723 B2* | 10/2018 | Wu | G06K 9/00711 |
| 2013/0127759 A1 | 5/2013 | Bae et al. | |
| 2013/0141643 A1* | 6/2013 | Carson | H04N 21/4307 |
| | | | 348/515 |
| 2013/0229498 A1* | 9/2013 | Yano | H04N 13/122 |
| | | | 348/51 |
| 2013/0249975 A1* | 9/2013 | Davie | G06F 3/016 |
| | | | 345/698 |
| 2014/0247120 A1 | 9/2014 | Ullrich | |
| 2014/0267904 A1 | 9/2014 | Saboune et al. | |
| 2015/0189223 A1* | 7/2015 | Levesque | H04N 5/9305 |
| | | | 386/227 |
| 2015/0199024 A1 | 7/2015 | Birnbaum et al. | |

(Continued)

OTHER PUBLICATIONS

Extended European Search Report dated Jan. 12, 2018 in corresponding European Patent Application No. 17 19 9074.

*Primary Examiner* — Eileen M Adams
(74) *Attorney, Agent, or Firm* — Medler Ferro Woodhouse & Mills PLLC (57) ABSTRACT

A method or system that receives input media including at least video data in which a video event within the video data is detected. Related data that is associated with the detected video event is collected and one or more feature parameters are configured based on the collected related data. The type of video event is determining and a set of feature parameters is selected based on the type of video event. A haptic effect is then automatically generated based on the selected set of feature parameters.

20 Claims, 6 Drawing Sheets

(56) References Cited

U.S. PATENT DOCUMENTS

2015/0268723 A1    9/2015  Saboune et al.
2015/0268726 A1*  9/2015  Saboune ................. G06F 3/017
                                          345/156
2016/0021333 A1*  1/2016  Lim ....................... H04N 5/765
                                          386/248

* cited by examiner

DYNAMIC HAPTIC GENERATION BASED ON DETECTED VIDEO EVENTS

CROSS-REFERENCE TO RELATED APPLICATIONS

This application is a continuation of prior U.S. application Ser. No. 15/338,763, filed on Oct. 31, 2016, which is hereby incorporated by reference in its entirety for all purposes.

FIELD

One embodiment is directed generally to haptic effects, and more particularly, to the generation of haptic effects based on detected video events.

BACKGROUND

Haptics is a tactile and force feedback technology that takes advantage of a user's sense of touch by applying haptic feedback effects (i.e., "haptic effects"), such as forces, vibrations, and motions, to the user. Devices, such as mobile devices, touchscreen devices, and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware then produces the appropriate haptic effect.

Devices can be configured to coordinate the output of haptic effects with the output of other content, such as games or other media, so that the haptic effects are incorporated into the other content. For example, in a gaming context, when a game is developed, a developer can embed haptic effects that are associated with the game and represent an action occurring within the game, such as machine gun fire, explosions, or car crashes. Typically, haptic effects are added to the game late in the game development process, such as when the game developer is finishing development of the game application, or when the game developer ports the finished game application to a new platform. This generally results in the phenomena where haptic effects are added after all the audio and video effects have been developed. Because haptic effects are typically added so late in the process, it generally falls on the haptic effect developer, or some other developer, to make a decision regarding associating a haptic effect with an audio or video effect. Further, a developer typically does not have input regarding a selection of an appropriate haptic effect for an audio or video effect.

SUMMARY

In an embodiment of the present disclosure, a method of dynamically generating haptic effects is presented. The method includes receiving input media including at least video data and detecting a video event within that video data. The method continues by collecting related data associated with the detected video event and then configuring one or more feature parameters based on the collected related data. A type of video event is determined and then a set of feature parameters based on the type of video event is selected. The method concludes by automatically generating a haptic effect based on the selected set of feature parameters.

BRIEF DESCRIPTION OF THE DRAWINGS

The accompanying drawings, which are incorporated herein and form part of the specification, illustrate the present invention and, together with the description, further serve to explain the principles of the present invention and to enable a person skilled in the relevant art(s) to make and use the present invention.

Additionally, the left most digit of a reference number identifies the drawing in which the reference number first appears (e.g., a reference number '310' indicates that the element so numbered is first labeled or first appears in FIG. 3). Additionally, elements which have the same reference number, followed by a different letter of the alphabet or other distinctive marking (e.g., an apostrophe), indicate elements which are the same in structure, operation, or form but may be identified as being in different locations in space or recurring at different points in time.

DETAILED DESCRIPTION

One embodiment is a method and system for detecting a video event and automatically generating a tailored, customized haptic effect for the detected video event. The method and system includes either manual or automatic detection of the video event. Related data, such as start time and end time of the event, pixel data and motion analysis data is collected. Feature parameters are configured based on the collected data. The type of video event is identified, e.g., a collision event or an explosion event. Then, based on the type of video event, a set of feature parameters is selected and a corresponding customized haptic effect is generated based on the selected set of feature parameters.

While embodiments described herein are illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

One embodiment is a system that automatically generates haptic effects based on detected video events, e.g. collisions or explosions in a video stream or segment. Embodiments include the automatic detection of a video event, analyzing video data and then configuring parameters to define and generate an associated haptic effect. The generated haptic effect is therefore based on the particular detected video event thereby producing a tailored haptic effect. The video detection can be done automatically or based on manually identified video events.

Figure 1:
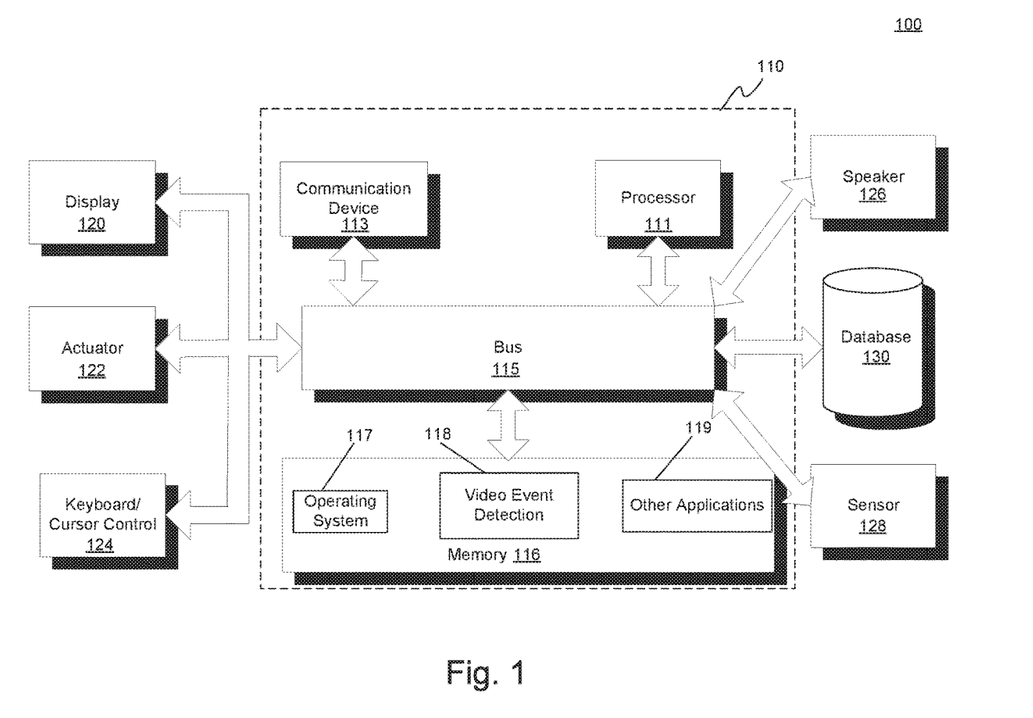
FIG. 1 illustrates a block diagram of a system, according to an embodiment of the present disclosure.

FIG. 1 illustrates a block diagram of a system 100, according to an embodiment. In one embodiment, system 100 is part of a device, and system 100 provides an automatic haptic effect based on a detected video event for the device. In another embodiment, system 100 is separate from the device, and remotely provides the automatic haptic effect based on a detected video event for the device. Although shown as a single system, the functionality of system 100 can be implemented as a distributed system. System 100 includes a bus 115 or other communication mechanism for communicating information, and a processor 111 coupled to bus 115 for processing information. Processor 111 may be any type of general or specific purpose processor. System 100 further includes a memory 116 for storing information and instructions to be executed by processor 111. Memory 116 can be comprised of any combination of random access memory ("RAM"), read only memory ("ROM"), static storage such as a magnetic or optical disk, or any other type of computer-readable medium.

A computer-readable medium may be any available transitory and non-transitory medium that can be accessed by processor 111 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 116 stores software modules that provide functionality when executed by processor 111. The modules include an operating system 117 that provides operating system functionality for system 100, as well as the rest of a device in an embodiment. The modules further include a video event detection module 118 that automatically detects a video event, as disclosed in more detail below. In certain embodiments, video event detection module 118 can include multiple modules, where each individual module provides specific individual functionality for detecting a video event. For example, video event detection module 118 may include a detection module that detects events based on color and motion analysis, on visual odometry, or on sport sensors or any other external sensors. System 100 will typically include one or more additional application modules 119 to include additional functionality, such as the "TouchSense" application by Immersion Corp., which integrates haptic effects with audio/visual input.

System 100, in embodiments that transmit and/or receive data from remote sources, further includes a communication device 113, such as a network interface card, to provide mobile wireless network communication, such as infrared, radio, Wi-Fi, or cellular network communication. In other embodiments, communication device 113 provides a wired network connection, such as an Ethernet connection or a modem.

Processor 111 is further coupled via bus 115 to a display 120, such as a Liquid Crystal Display ("LCD"), for displaying a graphical representation or user interface to a user. Display 120 may be a touch-sensitive input device, such as a touchscreen, configured to send and receive signals from processor 111, and may be a multi-touch touchscreen. Processor 111 may be further coupled to a keyboard or cursor control 124 that allows a user to interact with system 100, such as a mouse or a stylus.

System 100, in one embodiment, further includes an actuator 122. Processor 111 may transmit a haptic signal associated with a generated haptic effect to actuator 122, which in turn outputs haptic effects such as vibrotactile haptic effects, electrostatic friction haptic effects, or deformation haptic effects. Actuator 122 includes an actuator drive circuit. Actuator 122 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. In alternate embodiments, system 10 can include one or more additional actuators, in addition to actuator 122 (not illustrated in FIG. 1). Actuator 122 is an example of a haptic output device, where a haptic output device is a device configured to output haptic effects, such as vibrotactile haptic effects, electrostatic friction haptic effects, or deformation haptic effects, in response to a drive signal. In alternate embodiments, actuator 122 can be replaced by some other type of haptic output device. Further, in other alternate embodiments, system 100 may not include actuator 122, and a separate device from system 100 includes an actuator, or other haptic output device, that generates the haptic effects, and system 100 sends generated haptic effect signals to that device through communication device 113.

System 100 can further be operatively coupled to a database 130, where database 130 can be configured to store data used by memory 116. Database 130 can be an operational database, an analytical database, a data warehouse, a distributed database, an end-user database, an external database, a navigational database, an in-memory database, a document-oriented database, a real-time database, a relational database, an object-oriented database, or any other database known in the art.

In one embodiment, system 100 further includes one or more speakers 126. Processor 111 may transmit an audio signal to speaker 126, which in turn outputs audio effects. Speaker 126 may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker.

System 100, in one embodiment, further includes a sensor 128. Sensor 128 can be configured to detect a form of energy, or other physical property, such as, but not limited to, acceleration, bio signals, distance, flow, force/pressure/strain/bend, humidity, linear position, orientation/inclination, radio frequency, rotary position, rotary velocity, manipulation of a switch, temperature, vibration, or visible light intensity. Sensor 128 can further be configured to convert the detected energy, or other physical property, into an electrical signal, or any signal that represents virtual sensor information. Sensor 128 can be any device, such as, but not limited to, an accelerometer, an electrocardiogram, an electroencephalogram, an electromyography, an electrooculogram, an electropalatograph, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense CPS2 155, a miniature pressure transducer, a piezo sensor, a strain gage, a hygrometer, a linear position touch sensor, a linear potentiometer (or slider), a linear variable differential transformer, a compass, an inclinometer, a magnetic tag (or radio frequency identification tag), a rotary encoder, a rotary potentiometer, a gyroscope, an on-off switch, a temperature sensor (such as a thermometer, thermocouple, resistance temperature detector, thermistor, or temperature-transducing integrated circuit), microphone, photometer, altimeter, bio monitor, or a light-dependent resistor.

In general, automatic haptic conversion algorithms that generate haptic effects from sensory multimedia data, including audio and/or video data, lack a customized or tailored effect for a particular event. Embodiments presented in this disclosure inject the ability to dynamically tailor a haptic effect for a specific video event automatically, using a variety of detection and associated algorithm techniques.

Figure 2:
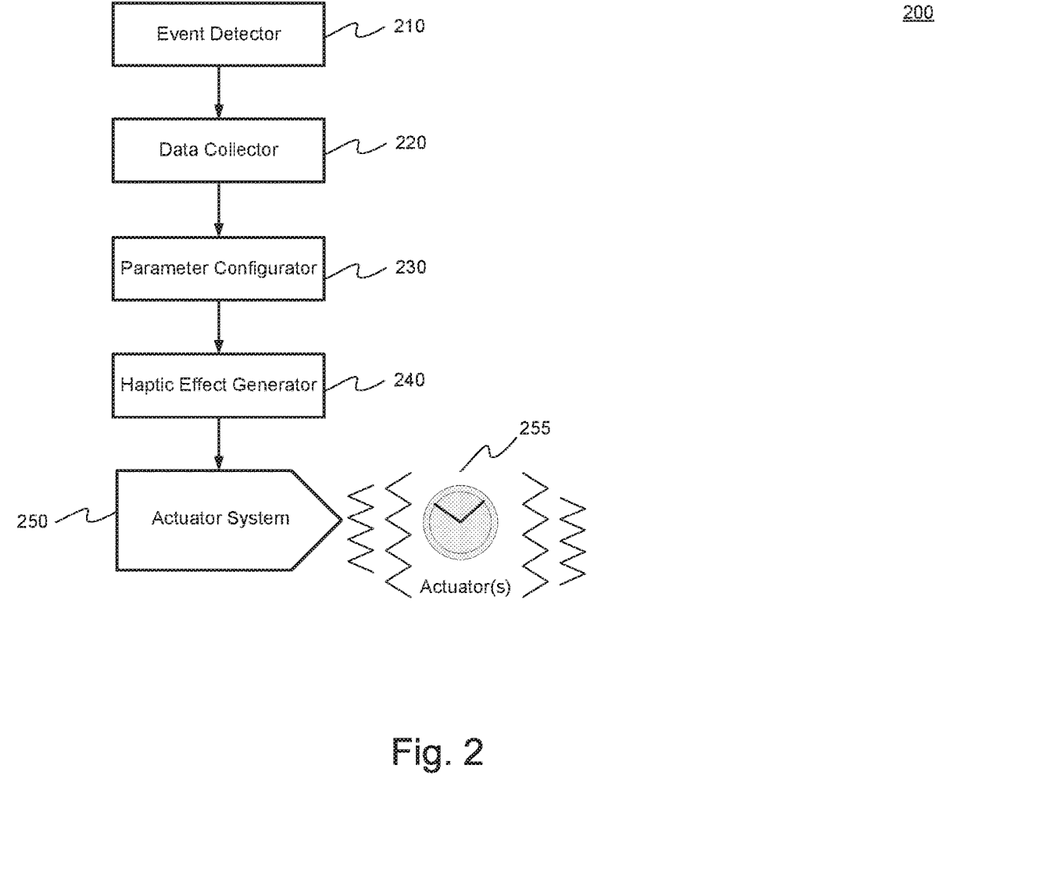
FIG. 2 is a block diagram of a haptic effect generation system that detects events, collects data, configures parameters and dynamically generates haptics, according to an embodiment of the present disclosure.

FIG. 2 is a block diagram of a haptic effect generation system 200, according to an embodiment. Haptic effect generation system 200 includes an event detector 210, a data collector 220, a parameter configurator 230, a haptic effect generator 240, an actuator system 250 and actuators 255.

Event detector 210 receives an input media. The input media can be a media file, a data stream including video content, or any other type of media content file. However, at a minimum the input media must contain some video content. Once the input media is received, event detector 210 then detects a video event contained within the received media content. Such detection is accomplished by the use of an event detection algorithm such as event detection based on color and motion analysis, or based on visual odometry, or on sport sensors or any other external sensor that identifies a start time and an end time of video events, also referenced to as target events, within the received input media. In another embodiment the event detection can be completed manually, for example by watching the input media on a frame by frame basis to identify when a video event starts and when it finishes.

Data collector 220 collects data associated with any identified video events based on the start time and end time of each of the detected video events. This associated data, or related data, can be any type of information achieved from an analysis of the video or from other signal processing algorithms. Such related data can include pixel data associated with the video event (e.g., size of an object). It can also be an analysis of the change in pixel data between consecutive frames (e.g., change in size of an object or event and/or movement of an object or event). The related data can also be the result of motion analysis and include the generation of a motion analysis vector, such as an optical flow vector. If the input media also contains an audio track then data collector 220 can also collect audio data corresponding to the detected video event such as magnitude and frequency of the audio.

Parameter configurator 230 uses the related data collected by data collector 220 to configure various parameters that will be used to dynamically generate a tailored haptic effect for the detected video event. These parameters can dynamically tune the parameters of the haptic effect including magnitude, frequency, duration, shape, pause space, attack time, attack level, fade time, fade level, etc. By effectively choosing feature parameters and optimizing the effect generation algorithm, the resulting haptic effect will highly match the unique features of the detected video event. For example, parameter configurator 230 can use the number of pixels collected by data collector 220 to reference the size of an object or event where a bigger size can result in stronger haptic effects. Also, by recognizing that the difference in the number of pixels of the object or event between consecutive frames of the input media can indicate a rate or expansion or movement so, for example, a larger expansion translates to a stronger haptic effect or where the object or event moves closer to the camera a stronger haptic effect is also generated.

The motion analysis data collected by data collector 220 can be used to determine a motion analysis vector. The direction of the vector indicates the direction of the motion and its value indicates the speed of the motion. In an embodiment, a larger change of direction may generate a stronger haptic and the greater the speed of the object or event, the more intense is the dynamically generated haptic effect. Parameter configurator 230 can also use any audio data collected by data collector 220 to configure parameters. For example, a higher magnitude of the audio track of the detected video event can result in a stronger haptic effect, where a frequency of the audio corresponds to a frequency of the haptic effect.

Haptic effect generator 240 selects the appropriate feature parameters to generate the tailored haptic effect for the detected video event. Haptic effect generator 240 first determines the type of video event that was detected. If the type of detected event was a collision event then haptic effect generator 240 will select feature parameters configured by parameter configurator 230 based on motion analysis vectors. Motion analysis vectors are a better choice as a parameter to generate dynamic effect for collision events. If the type of event is an explosion event then haptic effect generator 240 will select feature parameters that are based on the number of pixels, or the difference in the number of pixels between consecutive frames of the input media for the detected video event. Once haptic effect generator 240 selects the appropriate feature parameters based on the type of video event, it will dynamically generate a haptic effect. Specifically, haptic effect generator 240 will generate a set of haptic effect commands that are then passed to actuator system 250 that produces the haptic effects.

Actuator system 250 receives haptic commands, or instructions, from haptic effect generator 240 and operates actuators 255 that produce the desired haptic effect. Actuator system 250 also includes one or more drivers.

Figure 3:
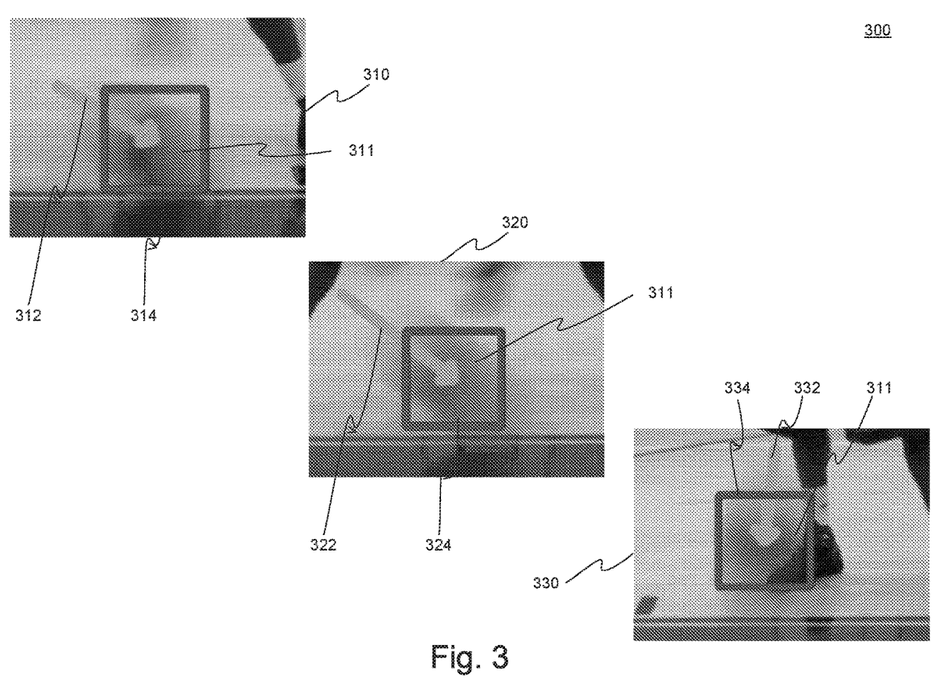
FIG. 3 is a pictorial illustration of the detection of a collision event, according to an embodiment of the present disclosure.

FIG. 3 is a pictorial illustration of a detection of a video collision event 300, according to an embodiment. Collision event 300 includes a sequence of three frames, 310, 320 and 330, in which three different collision incidents were detected. Video collision event 300 illustrates the collision of basketball 311 with the floor in the three frames 310, 320 and 330. In this example basketball 311 is being tracked and the direction and velocity of basketball 311 is calculated using video processing algorithms. The video processing algorithm detects collisions of basketball 311 against the floor showing the positions of basketball 311 in squares 314, 324 and 334. Motion analysis vectors 312, 322 and 332 indicate the velocity and direction of basketball 311. In an embodiment, haptic effects are generated based on two parameters of the velocity vector: the value of the vector (velocity) and the angle between the vector and the floor. The value of each velocity vector is unitized with a minimum value of 0 and a maximum value of 1. In an embodiment, the output haptic effect is a sinusoid with unitized magnitude from a minimum of 0 to a maximum of 1. The greater the collision angle perpendicular to the floor, and the higher value of the velocity, will result in a stronger, higher magnitude, and sharper, higher frequency and shorter duration, collision haptic effect.

Frame 310 displays velocity vector 312 with a velocity value of approximately 0.7, with a collision angle of approximately 35 degrees. In one embodiment this results in outputting an output haptic effect as a sinusoid with magnitude 0.7, frequency of 50 Hz and duration of 40 ms.

Frame 320 displays velocity vector 322 with a velocity value of approximately 1.0, with a collision angle of approximately 45 degrees. In one embodiment this results in outputting a haptic effect as a sinusoid with magnitude 1.0, frequency of 66 Hz and duration of 30 ms.

Frame 330 displays velocity vector 332 with a velocity value of approximately 0.7, with a collision angle of approximately 90 degrees. In one embodiment this results in outputting a haptic effect as a sinusoid with magnitude 0.9, frequency of 80 Hz and duration of 25 ms.

Figure 4A:
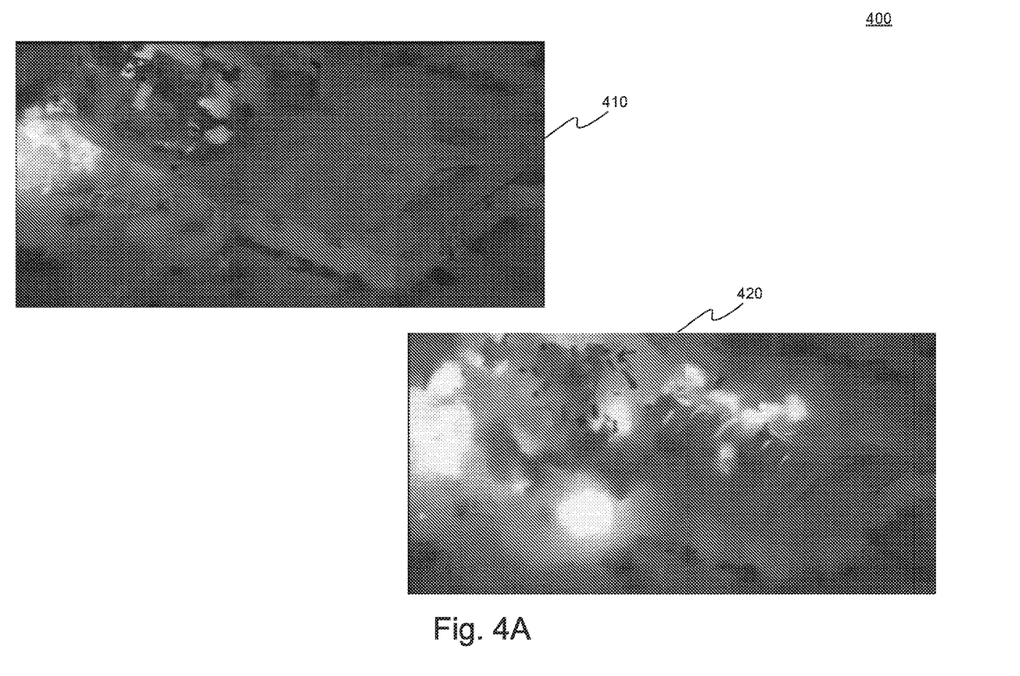
FIGS. 4A and 4B are pictorial illustrations of the detection of an explosion event, according to an embodiment of the present disclosure.
Figure 4B:
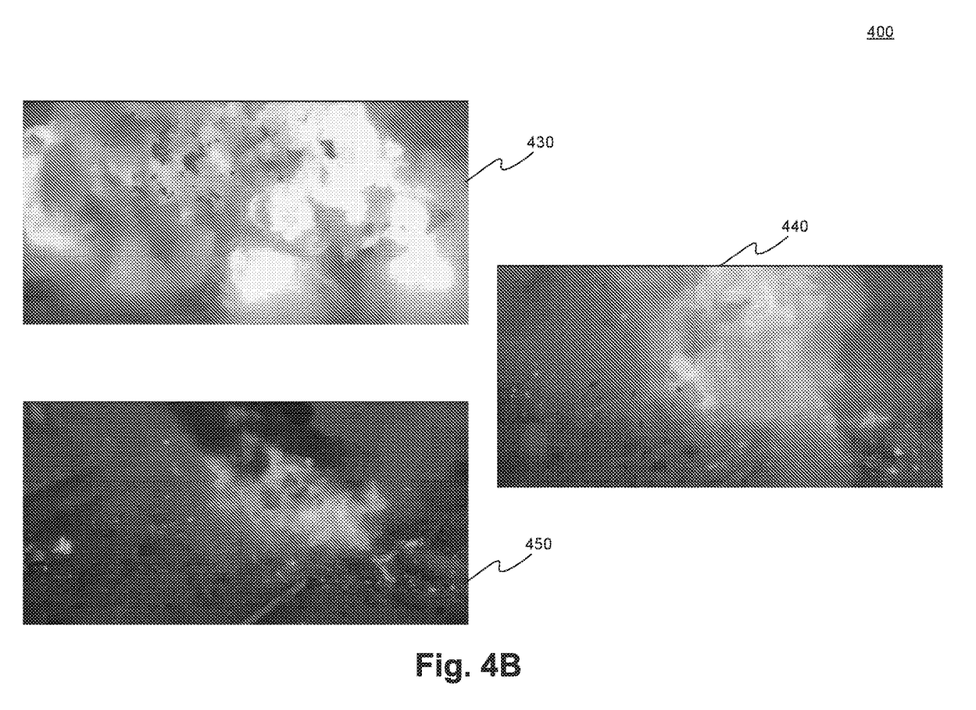

FIGS. 4A and 4B are a pictorial illustration of a detection of a video explosion event 400, according to an embodiment. Explosion event 400 includes a sequence of five frames, 410 and 420 shown in FIG. 4A and frames 430, 440 and 450 in FIG. 4B. In an embodiment, the output haptic effect of an explosion event is a magnitude-sweep haptic effect. Assuming that the frame rate of the sequence of frames 410-450 is 30 frames per second; the duration of magnitude-sweep haptic effect for one frame is 33 ms. In one embodiment, the magnitude of the haptics is unitized, and the range is from a minimum of 0 to a maximum of 1. The magnitude increases/decreases with the increase/decrease of the number of pixels of the detected explosion area. A fading factor (<1) is applied to the magnitude when the explosion area starts to decrease or stops increasing, which leads to the moment when the magnitude fades to 0 that indicates the explosion effect is finished. The fading factor is also dynamically changed based on the change amount of the pixels.

For example, in an embodiment, frame 410 illustrates the start moment of an explosion event, with approximately 500 pixels of explosion area. The output haptic effect is a magnitude-sweep haptic effect with magnitude 0.25, duration 33 ms.

Frame 420 illustrates the explosion area increasing to approximately 1000 pixels of explosion area. The output haptic effect is a magnitude-sweep haptic effect with magnitude 0.5, duration 33 ms.

Frame 430 illustrates the explosion area continuing to increase to more than 2000 pixels of explosion area. The output haptic effect is a magnitude-sweep haptic effect with magnitude 1.0, duration 33 ms. Further, the explosion area is stopping to expand and starts to decrease in frame 430. A fading factor (<1) is then applied to frames 440 and 450.

Frame 440 illustrates the explosion area decreasing to approximately 800 pixels of explosion area. The output haptic effect is a magnitude-sweep haptic effect with magnitude 0.4, duration 33 ms.

Frame 450 illustrates the end of the explosion where the area stays the same size, not increasing or decreasing. The magnitude fades to 0 even as the explosion area is still detected at approximately 500 pixels. The output haptic effect is a magnitude-sweep haptic effect with magnitude 0, indicating the explosion effect is ended.

Figure 5:
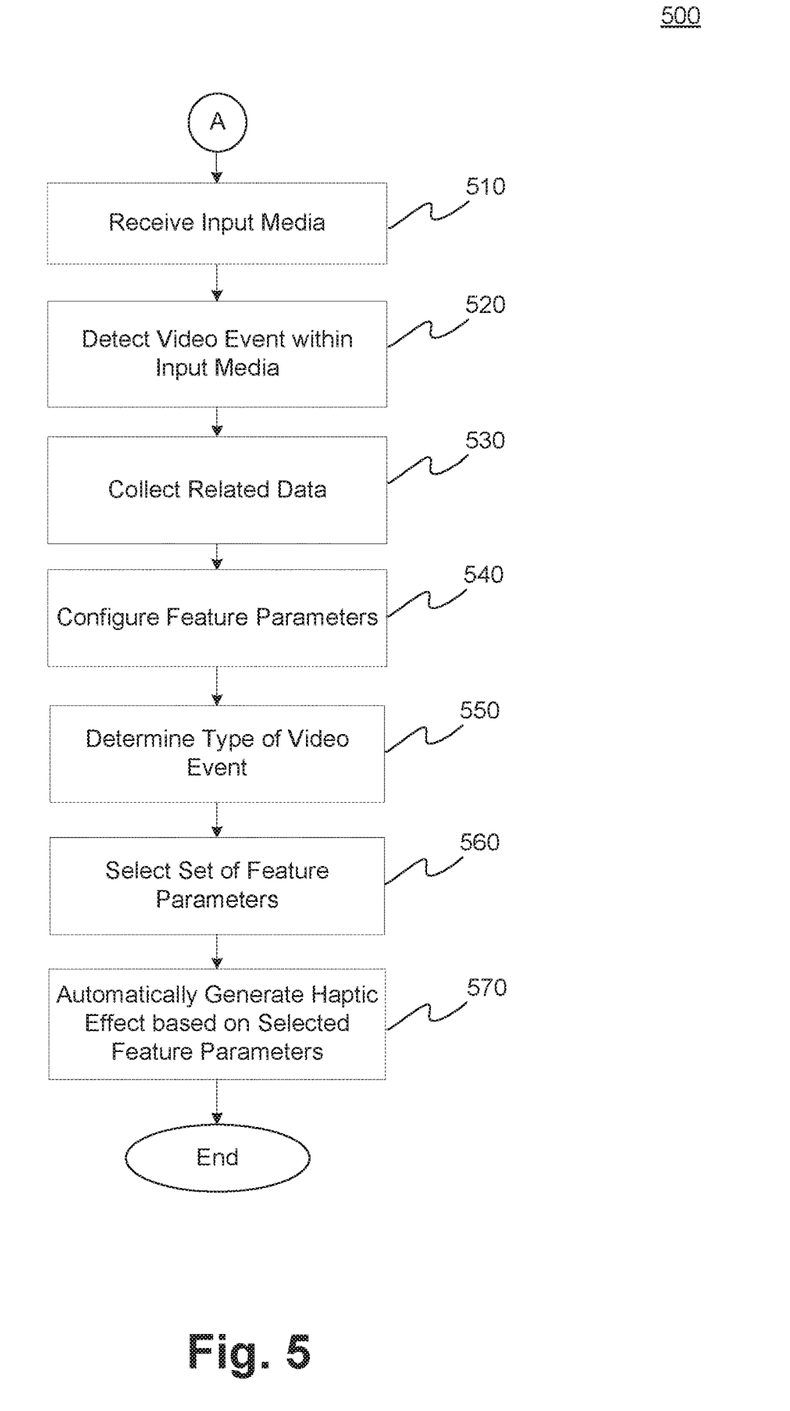
FIG. 5 is a flow diagram of the functionality of the system of FIG. 1 when automatically detecting a video event, according to an embodiment of the present disclosure.

FIG. 5 is a flow diagram of method 500 with the functionality of system 100 of FIG. 1 when dynamically generating a haptic effect, according to an embodiment. In one embodiment, the functionality of the flow diagram of FIG. 5 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

Method 500 starts at 510 where input media is received. As discussed in FIG. 2, the input media can be of any type or protocol, but includes at least video data. In an embodiment, the input media is received through communication device 113 and stored in database 130 in which processor 111 can initiate an analysis of the received input media.

At 520, one or more video events are detected. Such detection could be accomplished using video event detection module 118 that can utilize a variety of event detection algorithms including event detection based on color and motion analysis, or based on visual odometry, or based on sport sensors or any other external sensors—or manually by watching the input media on a frame-by-frame basis and identifying the start time and end time of any video events.

At 530, related data is collected. Related data is any data within the video event time frame. Related data can include pixel data or differences in pixel data between consecutive frames. Related data can also be motion analysis data that indicates the velocity and direction of motion of an object or event.

At 540, feature parameters are configured. Feature parameters will be used to dynamically generate and tune a tailored haptic effect for the detected video event. In an embodiment, the configuration of feature parameters uses either pixel analysis that counts the number of pixels of the detected object or event in each frame of the input media (e.g., as shown in FIGS. 4A and 4B), or uses of motion analysis that analyzes the velocity and direction of the detected event or object (e.g., as shown in FIG. 3).

At 550 the type of video event is determined. The type of video event will influence the selection of configuration parameters that will be used to generate the haptic effect associated with the detected video event. A video event can be classified as a collision event or an explosion event. Typically, a motion analysis vector (e.g., vector 312 of FIG. 3) is a better choice as a feature parameter for a collision event and a feature parameter based on pixel counts, or changes in pixel counts in consecutive frames, is a better choice as a feature parameter for an explosion event.

At 560 a set of feature parameters are selected. The algorithm for the feature parameter selection process allows for the ability to dynamically tune the haptic effect including its magnitude, frequency, duration, shape, pause space, attack time, attack level, fade time, fade level, etc. By effectively choosing feature parameters and optimizing the effect generation algorithm, the generated haptic effect will highly match the unique features of the target event.

Feature parameters of the detected events can be all types of parameters that can be achieved from the video content. Further, feature parameters can be the parameters of image pixels, including the color (for example, Red Green Blue "RGB" values), lightness and saturation (for example, hue, saturation, lightness "HSL" or hue, saturation, value "HSV" values). In this case, the input parameters of the algorithm are usually the average value of color, lightness, and/or saturation of pixels in certain area or the whole image of one frame/several frames of the video. For example, generating dynamic haptics according to the lightness value for certain detected events (such as lightning). Higher lightness values map to haptics with higher magnitude, higher frequency; lower lightness values map to haptics with lower magnitude, and lower frequency.

Feature parameters can be the change in the number of pixels that match certain conditions. For example, the number of pixels in red color, the number of pixels with lightness higher than 100 (the range of lightness is from 0 to 255), etc. Different number of pixels can map to different haptic parameters. The change in the number of pixels may refer to a size change, change in the distance from the camera, expansion, or contraction of the detected object or event. For instance, a larger expansion corresponds to stronger haptics; the haptic effect gets stronger when the object or event gets closer to the camera.

Feature parameters can be motion analysis vectors, such as optical flow vectors, of the detected object or event between consecutive frames of input media. The direction of the vector indicates the direction of the motion, and the value of the vector indicates the speed of the motion. For instance, larger changes of direction correspond to stronger haptics; larger change of the speed correspond to stronger haptics.

The choice of the feature parameters as the input of the algorithm, and how they map to the output haptic parameters depend on the characteristics of different detected events. The map could be linear/non-linear/random, which can generate different styles of haptics for the target events.

In 570, a haptic effect is automatically generated based on the selected feature parameters as described above in 560. For example, the generation of haptic effects is accomplished by the use of haptic effect generator 240 that generates a set of haptic effect commands that are then passed to actuator system 250 and where actuator system 250 receives the haptic commands, or instructions, from haptic effect generator 240 and operates actuators 255 to produce the desired haptic effect.

The methods and systems presented receive an input media that includes video data in which a video event is detected. Related data that is associated with the detected video event is collected and one or more feature parameters are configured based on the collected related data. The type of video event is also determined and a set of feature parameters is selected based on the type of video event. A haptic effect is then automatically generated based on the selected set of feature parameters. The ability to automatically generate a customized, tailored effect based on a particular video event is highly efficient where each event has its own unique haptics. Further the presented approach is highly flexible and can easily merge with other haptic generation method to create a wide range of diverse haptics.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of dynamically generating haptic effects comprising:
   receiving input media including video content;
   providing color and motion analysis of the video content;
   detecting a video event within the video content based on the color and motion analysis of the video content;
   collecting related data associated with the detected video event;
   configuring one or more feature parameters based on the related data associated with the detected video event; and
   generating a haptic effect based on the one or more configured feature parameters.

2. The method of claim 1, wherein collecting the related data includes at least one of collecting pixel data of a set of consecutive frames of the detected video event, performing motion analysis of an object or event within a set of consecutive frames of the detected video event, or collecting audio track data of a set of consecutive frames of the detected video event.

3. The method of claim 1, wherein configuring the one or more feature parameters includes configuring a haptic parameter based on at least one of
   a number of pixels associated with the detected video event,
   a motion analysis vector between a set of consecutive frames of the detected video event, or
   a magnitude or frequency of an audio track of the detected video event.

4. The method of claim 1, wherein configuring the one or more feature parameters includes configuring a haptic parameter based on a difference in a number of pixels corresponding to the detected video event between a set of consecutive frames.

5. The method of claim 1, further comprising:
   determining a type of the detected video event; and
   selecting a set of feature parameters from the one or more configured feature parameters based on the type of the detected video event,
   wherein the haptic effect is generated based on the set of feature parameters.

6. The method of claim 5, wherein selecting the set of feature parameters includes selecting use of a motion analysis vector when the type of the detected video event is a collision event or use of a number of pixels when the type of the detected video event is an explosion event.

7. A haptic effect generation system comprising:
   a memory unit configured for storing instructions; and
   a processor configured to execute the software instructions stored on the memory unit to
      receive input media including video content,
      provide color and motion analysis of the video content,
      detect a video event within the video content based on the color and motion analysis of the video content,
      collect related data associated with the detected video event,
      configure one or more feature parameters based on the related data associated with the detected video event, and
      generate a haptic effect based on the one or more configured feature parameters.

8. The haptic effect generation system of claim 7, wherein the processor is further configured to execute instructions to
   determine a type of the detected video event, and
   select a set of feature parameters from the one or more configured feature parameters based on the type of the detected video event,
   wherein the haptic effect is generated based on the set of feature parameters.

9. A method of dynamically generating haptic effects comprising:
   collecting related data associated with a video event within video content;
   configuring one or more feature parameters based on the related data associated with the video event, wherein configuring the one or more feature parameters includes configuring a haptic parameter based on a difference in a number of pixels corresponding to the video event between a set of consecutive frames; and
generating a haptic effect based on the one or more configured feature parameters associated with the configured haptic parameter.

10. The method of claim 9, wherein collecting the related data includes at least one of collecting pixel data of the set of consecutive frames of the video event, performing motion analysis of an object or event within the set of consecutive frames of the video event, or collecting audio track data of the set of consecutive frames of the video event.

11. The method of claim 9, wherein configuring the one or more feature parameters further includes configuring the haptic parameter based on at least one of
a motion analysis vector between the set of consecutive frames of the video event, or
a magnitude or a frequency of an audio track associated with the video event.

12. The method of claim 9, further comprising:
receiving input media including the video content;
providing an analysis of the video content; and
detecting the video event within the video content based on the analysis of the video content.

13. The method of claim 12, wherein the analysis of the video content includes color and motion analysis.

14. The method of claim 9, further comprising:
determining a type of the video event; and
selecting a set of feature parameters from the one or more configured feature parameters based on the type of the video event,
wherein the haptic effect is generated based on the set of feature parameters.

15. The method of claim 14, wherein selecting the set of feature parameters includes selecting use of a motion analysis vector when the type of the video event is a collision event or use of a number of pixels when the type of the video event is an explosion event.

16. The method of claim 9, wherein configuring the one or more haptic parameters based on the difference in the number of pixels corresponding to the video event between the set of consecutive frames comprises configuring the one or more haptic parameters based on whether the number of pixels corresponding to the video event has increased or decreased between the set of consecutive frames.

17. The method of claim 9, wherein the difference in the number of pixels corresponding to the video event between the set of consecutive frames indicates a difference in a size of the video event between the set of consecutive frames.

18. A haptic effect generation system comprising:
a memory unit configured for storing instructions; and
a processor configured to execute the instructions stored on the memory unit to
collect related data associated with a video event within video content,
configure one or more feature parameters based on the related data associated with the video event, wherein configuring the one or more feature parameters includes configuring a haptic parameter based on a difference in a number of pixels corresponding to the video event between a set of consecutive frames, and
generate a haptic effect based on the one or more configured feature parameters associated with the configured haptic parameter.

19. The haptic effect generation system of claim 18, wherein the processor is further configured to execute instructions to
receive input media including the video content, and
provide an analysis of the video content; and
detect the video event within the video content based on analysis of the video content.

20. The haptic effect generation system of claim 18, wherein the processor is further configured to execute instructions to
determine a type of the video event and
select a set of feature parameters from the one or more configured feature parameters based on the type of the video event,
wherein the haptic effect is generated based on the set of feature parameters.

* * * * *